United States Patent
Han (10) Patent No.: US 9,342,438 B2
(45) Date of Patent: May 17, 2016

(54) METHOD AND SYSTEM FOR DATA-TRIGGERED DYNAMIC LOG LEVEL CONTROL

(71) Applicant: YAHOO! INC., Sunnyvale, CA (US)

(72) Inventor: Yiping Han, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 238 days.

(21) Appl. No.: 13/833,510

(22) Filed: Mar. 15, 2013

(65) Prior Publication Data

US 2014/0279918 A1    Sep. 18, 2014

(51) Int. Cl.
*G06F 17/30*     (2006.01)
*G06F 11/36*     (2006.01)

(52) U.S. Cl.
CPC .................................... *G06F 11/366* (2013.01)

(58) Field of Classification Search
CPC ...... H04L 63/1425; H04L 63/00; H04L 63/14
USPC ............................................................ 707/672
See application file for complete search history.

(56) References Cited

U.S. PATENT DOCUMENTS

| | | | |
|---|---|---|---|
| 6,278,784 B1 * | 8/2001 | Ledermann | 381/58 |
| 6,922,754 B2 * | 7/2005 | Liu et al. | 711/138 |
| 7,233,940 B2 * | 6/2007 | Bamberger et al. | |
| 7,840,664 B2 * | 11/2010 | Dugatkin et al. | 709/224 |
| 8,713,676 B2 * | 4/2014 | Pandrangi et al. | 726/22 |
| 2004/0117441 A1 * | 6/2004 | Liu et al. | 709/203 |
| 2009/0248481 A1 * | 10/2009 | Dick et al. | 705/9 |
| 2010/0005259 A1 * | 1/2010 | Prahlad et al. | 711/162 |
| 2011/0283357 A1 * | 11/2011 | Pandrangi et al. | 726/22 |
| 2012/0051022 A1 * | 3/2012 | Dong et al. | 361/807 |
| 2013/0086429 A1 * | 4/2013 | Ng | 714/38.1 |
| 2013/0227352 A1 * | 8/2013 | Kumarasamy et al. | 714/47.1 |
| 2013/0305226 A1 * | 11/2013 | Carey | G06F 11/3476 717/128 |
| 2014/0128057 A1 * | 5/2014 | Siomina et al. | 455/423 |

* cited by examiner

*Primary Examiner* — Baoquoc To
(74) *Attorney, Agent, or Firm* — Pillsbury Winthrop Shaw Pittman LLP (57) ABSTRACT

Embodiments of the present teachings disclose method, system, and programs for data driven dynamic logging. Data is received by a logging system where the data is flagged for dynamic logging when one or more dynamic flagging level criteria are satisfied. Data is evaluated by a logging module wrapper, which determines whether to log the data using the default logging level or dynamic logging level, according to whether the data is flagged. A logging module logs information in a logging database according to the default logging level or dynamic logging level. Based on the logged information and detected abnormalities the dynamic flagging level and dynamic logging level are automatically or manually adjusted.

11 Claims, 9 Drawing Sheets

METHOD AND SYSTEM FOR DATA-TRIGGERED DYNAMIC LOG LEVEL CONTROL

BACKGROUND

1. Technical Field

The present teaching relates to methods, systems and programming for data processing. Particularly, the present teaching is directed to methods, systems, and programming for managing system logging.

2. Background

In a software system running in production, the system may experience periodic problems. When a problem is observed, one often has to look into the system log to debug the cause of the problem. However, in most production systems, log levels are set at FATAL/ERROR/WARNING, with some systems that include additional information. But generally systems in production would not be set to a DEBUG level, which is the most detailed method for debugging a system. Most systems do not enable DEBUG mode due to the fact that logging at such a level is extremely expensive, utilizes a vast amount of system resources and significantly reduces the system performance.

A common practice is to raise the log level to DEBUG temporarily on those servers or platforms that experience a problem. However, many system problems are not easily replicated and hence such methods are not effective at catching system problems. Current methods of logging system problems in production mode are inadequate. Therefore there is a technical need to enable the logging of enough DEBUG information in production systems that would allow one to debug issues when the problems are encountered in a running production system without significantly decreasing the performance of the system. What is desired therefore is a solution that allows for precise and efficient debugging of technical problems in production systems without having to run DEBUG mode continuously.

SUMMARY

The teachings disclosed herein relate to methods, systems, and programming for data processing. More particularly, the present teaching relates to methods, systems, and programming for managing system logging. In an embodiment, of the present disclosure a method implemented on a computing device having one or more processor, storage, and communication platform for creating a log is disclosed. The method comprises obtaining a log level indicative of a level at which data traffic is to be marked as being logged, marking data traffic in accordance with the log level, where the log level is dynamically adjusted based on the health of the data traffic.

In another embodiment the method is includes obtaining a log level indicative of an extent to which a data traffic is to be logged, receiving a data traffic, logging the data traffic in accordance with the log level, where the log level is dynamically adjusted based on the health of the data traffic.

In another embodiment the method is includes obtaining a first log level indicative of a first level at which data traffic is to be marked as being logged; marking data traffic in accordance with the first log level, obtaining a second log level indicative of a second level at a data traffic marked to be logged is to be logged, logging a data traffic marked to be logged in accordance with the second log level, where the first and second log levels are dynamically adjusted based on the health of the data traffic.

In another embodiment the method is includes obtaining a log level indicative of a level at which data traffic is to be marked as being logged, accessing log data collected from a data traffic that is marked to be logged in accordance with the log level, estimating the health of the data traffic based on the log data, adjusting the log level to generated an adjusted log level in accordance with the health of the data traffic, where the adjusted log level is with respect to the data traffic.

In another embodiment the method is includes obtaining a log level indicative of a level at which a data traffic is to be logged, accessing log data collected from a data traffic that has been logged in accordance with the log level, estimating the health of the data traffic based on the log data, adjusting the log level to generated an adjusted log level in accordance with the health of the data traffic, where the adjusted log level is with respect to the data traffic.

In another embodiment the method is includes obtaining a first log level indicative of a level at which data traffic is to be marked as being logged, obtaining a second log level indicative of a level at which a data traffic is to be logged, accessing log data collected from a data traffic that has been marked as being logged in accordance with the first log level and has been logged in accordance with the second log level, estimating the health of the data traffic based on the log data, adjusting the first and second log levels to generated an adjusted first log level and a adjusted second log level in accordance with the health of the data traffic, where the adjusted first and second log levels are with respect to the data traffic.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of methods and systems for data driven dynamic adjustment of log levels. Since flexibility in logging is crucial in light of the performance and troubleshooting requirements of modern web-based applications, the improved methods of dynamically adjusting logging levels is fundamentally important. Potential applications are not limited to dynamically logging input data or user requests in web applications, and include, but are not limited to, database system logging, operating system logging, application development, network devices, computer programs, etc.

Figure 1:
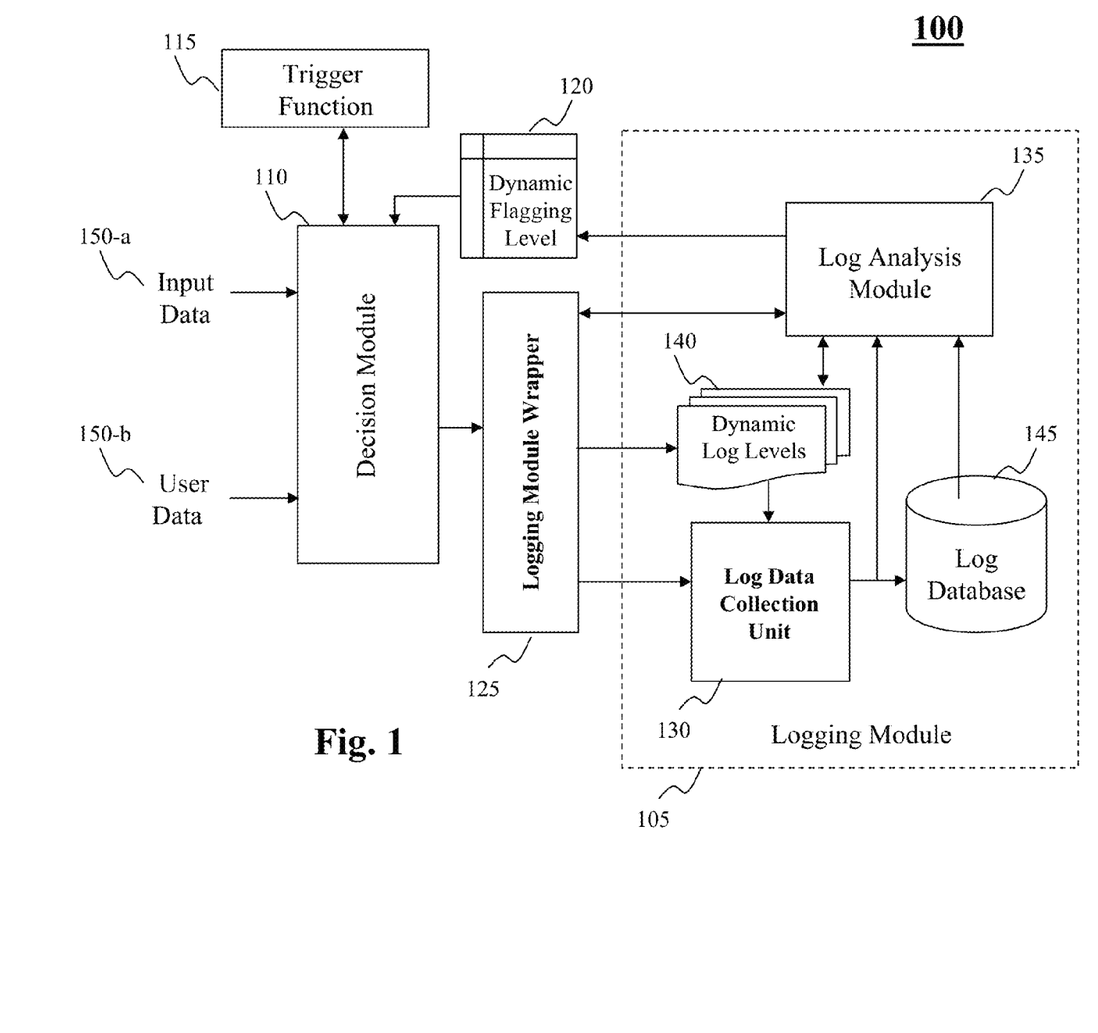
FIG. 1 is a high level depiction of an exemplary data driven dynamic logging system, according to an embodiment of the present teaching.

Motivated by this challenge, the teachings presented herein provide a system or service that utilizes improved approaches to controlling log levels dynamically in order to adjust logging to account for changing system conditions. FIG. 1 is a high level depiction of a system configuration in which data driven dynamic logging can be applied in a system according to an embodiment of the present teaching. The exemplary system 100 includes a logging module 105, a decision module 110, a trigger function 115, dynamic flagging levels 120, a logging module wrapper 125, a log data collection unit 130, a log analysis module 135, dynamic logging levels 140, a log database 145, input data 150-a, and user data 150-b. The input data 150-a and user data 150-b can be any type of communication received by the system 100. For example, input data could be a request for a particular piece of content stored on a web server, an event such as a browser crashing or shutting down, a user navigating away from a page, abnormal levels of latency on a web page, or other characteristics or events that may be indicative of application or network problems. User data may be, including but not limited to, data submitted by or pertaining to a user that is provided in the course of interaction with a web application. For example, such data may include data pertaining to users of a web application that have sent a request for assistance or technical support or data from or pertaining to users interacting in a live chat feed with administrators of the web page.

The decision module 110 may determine whether input data 150-a or user data 150-b should be flagged for dynamic logging. The decision module 110 may use a function, input, signal, or criteria supplied by, for example, one or more of the trigger function 115 or dynamic flagging level 120. In some embodiments, the decision module may then attach a data flag to the input data 150-a or user data 150-b and may communicate the data, and data flag if attached, to the logging module wrapper 125. The trigger function 115 may provide a function or criteria used by the decision module 110 to determine whether input data 150-a or user data 150-b submitted to the system should be flagged for dynamic logging. The dynamic flagging level 120 may contain criteria used to determine whether data should be flagged by the decision module 110. In some embodiments, the dynamic flagging level 120 may be updated by the log analysis module 135 to modify the data flagged for dynamic logging. For example, if the decision module 110 flagged a random sampling of data for dynamic logging and the log analysis module 135 determines that logs related to a particular piece of content are creating errors, the log analysis module 135 may indicate to the dynamic flagging level 120 that all data related to that piece of content should be flagged by the decision module 110. This feedback mechanism allows the system to continuously adjust and readjust the logging levels.

In some embodiments, the logging module wrapper 125 may determine whether data is flagged by the decision module 110 and communicate with the log analysis module 135, log data collection unit 130, and dynamic log levels 140 as appropriate. For example, if the decision module 110 did not attach a data flag to a particular data, the logging module wrapper may forward that data to the log data collection unit 130 to be logged using the normal logging level without any modification. However, if the decision module 110 did attach a data flag to the particular data, the logging module wrapper 125 may communicate with one or more of the log analysis module 135, dynamic log levels 140, and log data collection unit 130 to indicate that the data should be logged using the dynamic logging level. The log data collection unit 130 may receive data from the logging module wrapper 125 and write the data to the log database 145 using the normal logging level, if no data flag is attached, or the dynamic logging level if a data flag is attached. The dynamic logging level may be provided to the log data collection unit 130 by the dynamic log levels 140 data structure. Dynamic log levels 140 may contain a set of available logging levels used to collect log information from data input to the data driven dynamic logging system. For example, production logging levels may be set, for performance reasons, to ERROR or a similar logging level that only collects logging information regarding errors or other severe system events. In some embodiments, dynamic log levels 140 may contain other logging levels that are available to dynamically log appropriate information related to data the decision module 110 may identify for dynamic logging. Examples of dynamic logging levels include, but are not limited to, WARNING, DEBUG, and ERROR, or any other level that indicates a system performance problem.

In some embodiments, the log data collection unit 130 may provide log collection information to the log analysis module 135 to analyze the log and determine if there are abnormalities present. The log analysis module 135 may automatically update the dynamic flagging level 120 or the dynamic log levels 140 if an abnormality is detected or if a threshold is crossed that requires an adjustment to the logging levels. The log database 145 may collect log information provided by the log data collection unit 130. The log information provided to the log database 145 may contain log information regarding particular data according to whether the normal logging level or dynamic logging level was used to collect log information from said data.

The log analysis module 135 may communicate with the logging module wrapper 125, log data collection unit 130, dynamic log levels 140, and log database 140 and may determine if the dynamic flagging level 120 or dynamic log levels 140 should be adjusted. The log analysis module 135 may then communicate adjusted flagging or log levels to the dynamic flagging level 120 or dynamic log levels 140, respectively. Additionally, in some embodiments, the dynamic flagging level 120 and dynamic log levels 140 may be updated manually by developers to set the dynamic flagging level 120 and dynamic log levels 140 to particular desired levels.

Figure 2:
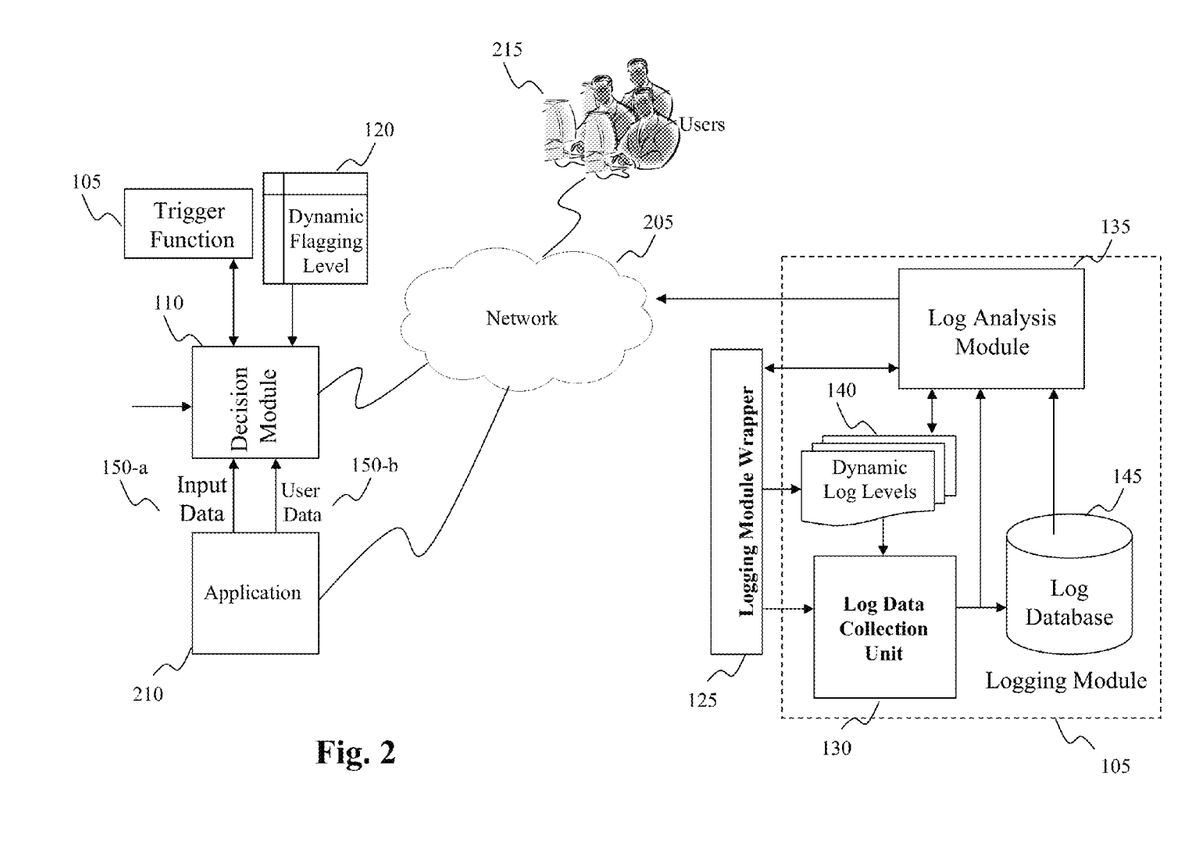
FIG. 2 is a high level depiction of an exemplary data driven dynamic logging system, according to an embodiment of the present teaching.

FIG. 2 represents a similar system configuration as what is shown in FIG. 1 except that a network 205, application 210, and users 215 are included, according to an embodiment of the present teaching. In this embodiment, the decision module 110, trigger function 105 and dynamic logging level 120 are decoupled from the logging module wrapper 125 and the logging module 105 which may reside on another part of the network. In this exemplary system, decision module 110 accepts input data 150-a and user data 150-b from an application 210. The decision module 110 and application 210 are connected with the logging module 105 via the network 205. The network 205 may be a single network or a combination of different networks. For example, a network can be a local area network (LAN), a wide area network (WAN), a public network, a private network, a proprietary network, a Public Switched Telephone Network (PSTN), the Internet, a wireless network, a virtual network, or any combination thereof. A network may also include various network access points, e.g., wired or wireless access points such as base stations or Internet exchange points through which a data source may connect to the network in order to transmit information via the network.

Users 215 may be of different types such as system administrators or application developers. A user 215 may manually communicate with the decision module 110 or log analysis module 135 to adjust the dynamic flagging level 125 or dynamic log levels 140.

Figure 3:
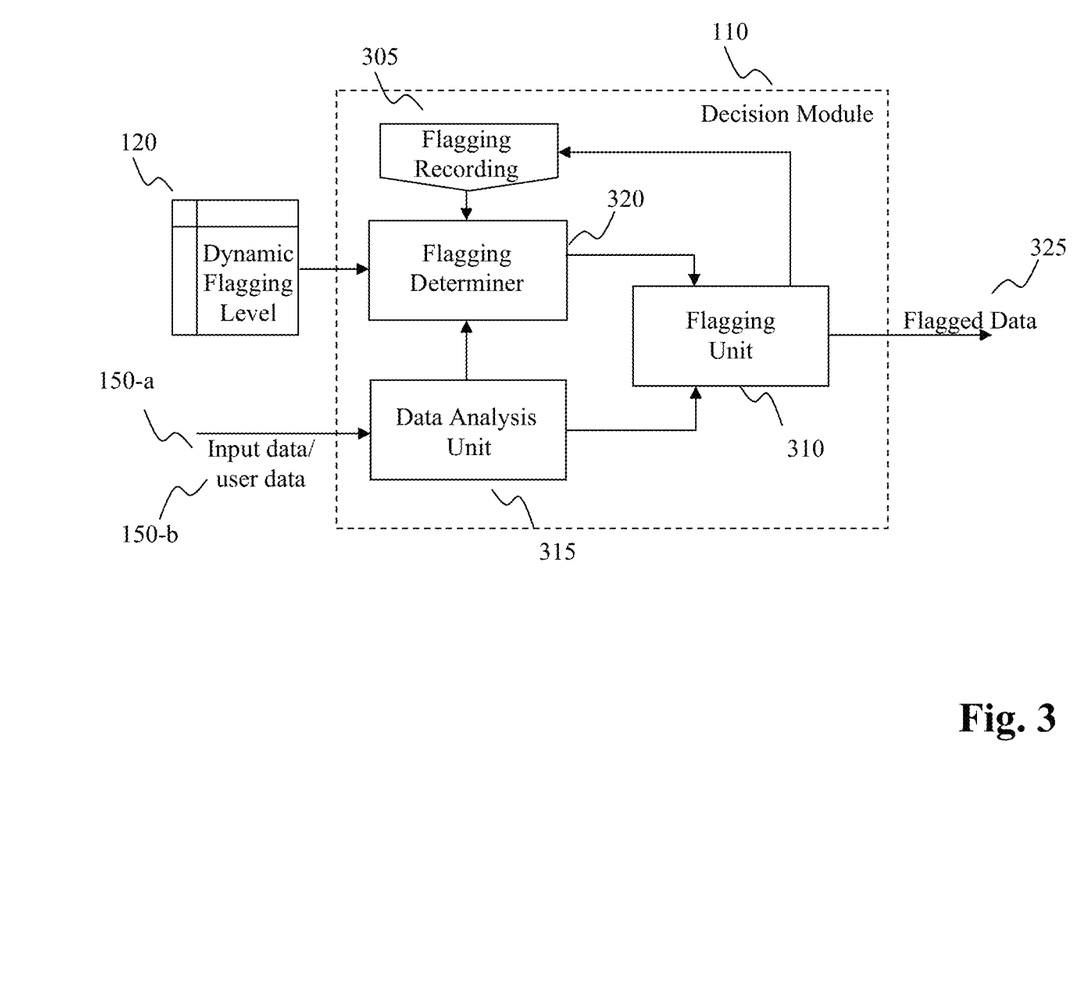
FIG. 3 is a high level depiction of an exemplary decision module, according to an embodiment of the present teaching.

FIG. 3 is a high level depiction of an exemplary decision module 110, according to an embodiment of the present teaching. In this illustrated embodiment, the input data 150-$a$ or user data 150-$b$ may be evaluated to determine whether it should be flagged for subsequent logging using the dynamic flagging level 120. Whether particular data should be flagged may be determined using a random sampling rate, event trigger, or according to particular characteristics such as data related to a particular user, content, or browser. Data may be communicated to a logging module wrapper from the decision module, and may be communicated regardless of whether the data has been flagged.

The exemplary decision module 110 comprises a data analysis unit 315 which evaluates the incoming data to determine whether it is a data type that may be need to be logged. The decision module 110 may also include a flagging determiner 320, flagging unit 310, flagging recording 305, and dynamic flagging level 120. The data analysis unit 320 may evaluate whether the data should be forwarded to the flagging determiner 320, flagging unit 310, or both. For example, this evaluation may relate to a user who submitted the input data or user data, the content requested, or other criteria. The flagging determiner 320 may compute whether the data received from the data analysis unit 320 should be flagged according to a specific criteria or threshold. For example, this determination may be based on one or more of dynamic flagging levels 120, prior flagging recordings 305, or criteria supplied by the data analysis unit 315.

The flagging unit 310 as depicted in this exemplary embodiment may attach or not attach a data flag to the input data or user data received from the data analysis unit 315 according to the determination of the flagging determiner 320. The data and, if present, data flag may then be transmitted as flagged data 325 to, for example, a logging module wrapper as discussed herein. For example, a user may request a particular piece of content that is no longer hosted by a particular web site or has clicked on a non-functional URL or icon. Requests for this content or input signal may have been configured as a criteria to flag data, and the data analysis unit 315 may use this criteria to forward the request to the flagging determiner 320 to determine whether a flag should be added or not based on specified or predefined criteria that may set a threshold for flagging. For example, a data analysis unit can determine that certain input data is indicative of a problem, like a browser shutting down. However, one browser shutting down may not be enough for a flag to be added in order to register this as a potential problem. If however, 100 browsers are shut down on application web page within a specific time frame, this input from the data analysis unit may cross the threshold for the flagging determiner to determine that a flag needs to be added to this activity on the application page in question. The flagging determiner 320 may also determine that the data should be flagged according to the dynamic flagging level 120 and may communicate this determination to the flagging unit 310. The flagging unit 310 attaches a data flag to the request for content and communicates this flagged data to the logging module wrapper 125.

Figure 4:
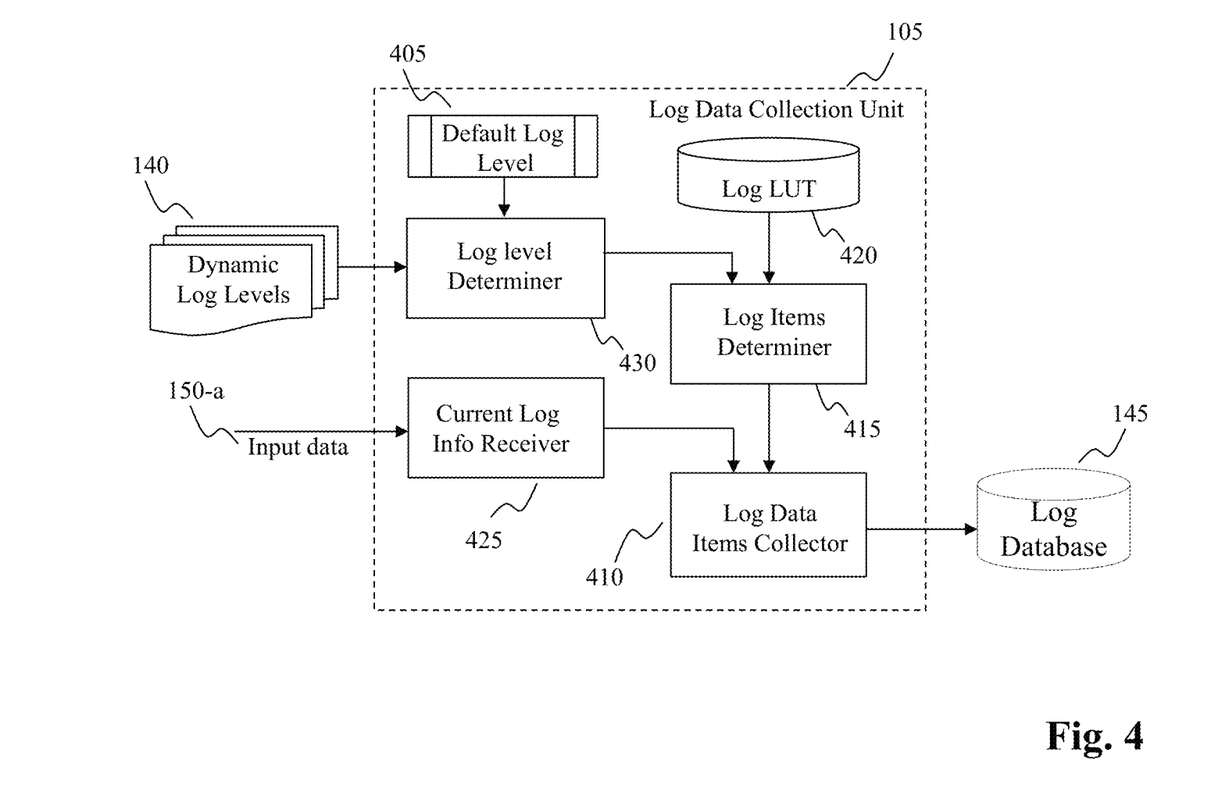
FIG. 4 is a high level depiction of an exemplary log collection unit, according to an embodiment of the present teaching.

FIG. 4 is a high level depiction of an exemplary log data collection unit 130, according to an embodiment of the present teaching. In this illustrated embodiment, the input data 150-$a$ is received by the log data collection unit 130 and log data, either normal or according to dynamic logging levels, is written to the log database 145. The ability to record additional log data for only that input data 150-$a$ or user data 150-$b$ that is flagged, for example, is much more useful than conventional approaches that are incapable of varying logging levels dynamically to obtain additional log details when needed without imposing severe performance burdens on the systems being logged.

Figure 5:
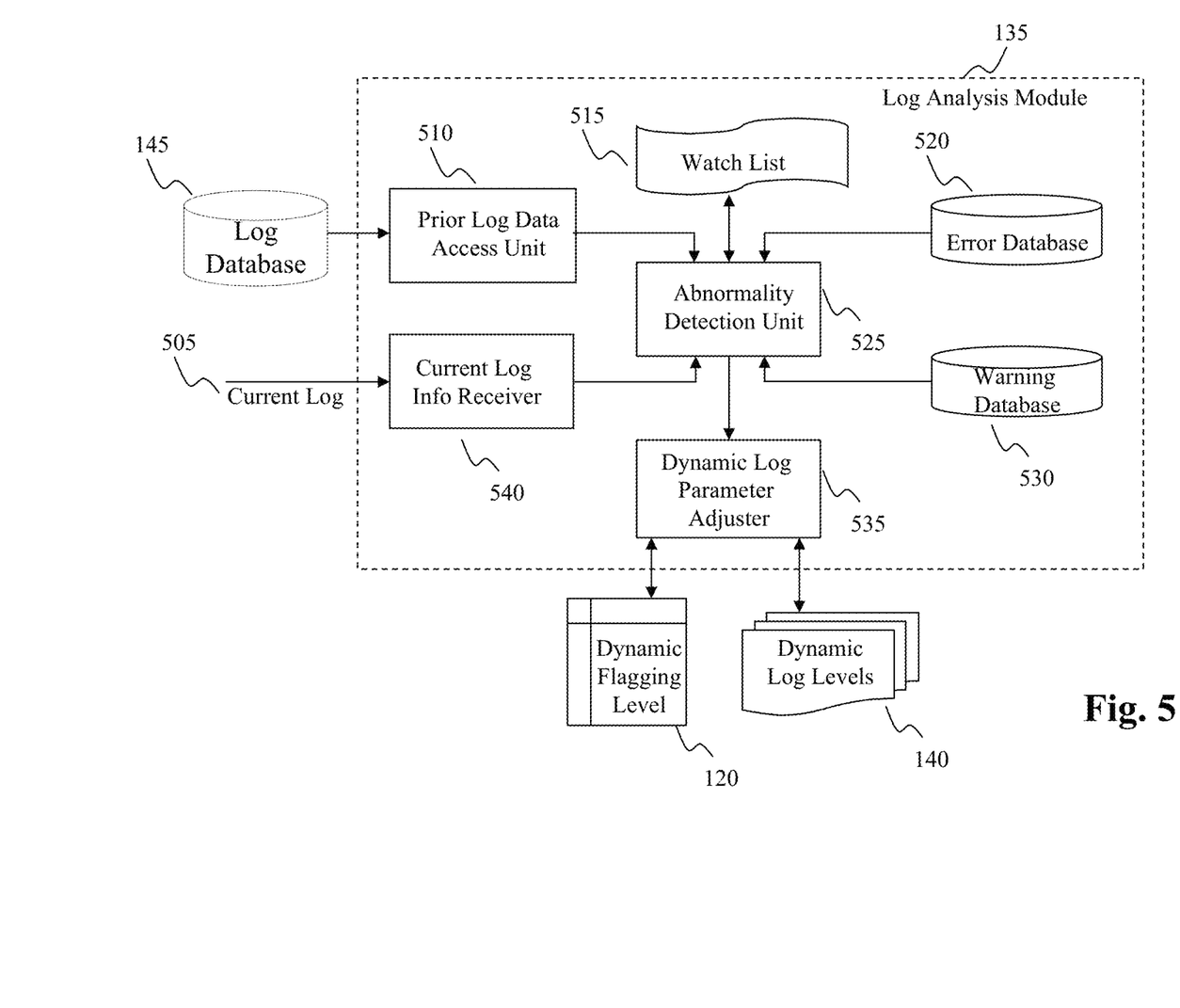
FIG. 5 is a high level depiction of an exemplary log analysis module, according to an embodiment of the present teaching.

The exemplary log data collection unit 130 comprises a default log level 405, log data items collector 410, log items determiner 415, log look up table (LUT) 420, current log info receiver 425, and log level determiner 430. The default log level 405 may contain the logging level for data that is not flagged for dynamic logging. For example, the default log level may be set to ERROR, which would include logging only system errors and not warnings or other events. The log data items collector 410 may control what logs are written to the log database 145. For example, for data flagged for dynamic logging, the log data items collector 410 may record logs consistent with the dynamic log levels 140 and may record logs consistent with the default log level 405 if data is not flagged. The log items determiner 415 may determine what aspects of the data should be recorded under the dynamic log level 140 by obtaining the log items to be recorded through the log LUT 420. The log LUT (look up table) 420 may contain the items to be logged for each logging level that may be set as a dynamic logging level. For example, a log LUT may consist of items related to a WARNING log level or DEBUG logging level that includes information related to all log events. The current log info receiver 425 may receive input data 150-$a$ and prepare that data to have items relevant to the applicable logging level collected by the log data items collector 410. The log level determiner 430 may determine whether the default log level 405 or the dynamic log level 140 should be applied to the respective input data 150-$a$ received by the current log info receiver 425. FIG. 5 is a high level depiction of an exemplary log data analysis module 105, according to an embodiment of the present teaching. In this illustrated embodiment, a current log may be received and analyzed for abnormalities, which may result in an adjustment to one or more of the dynamic flagging level 120 or dynamic log levels 140. The exemplary log analysis module 135 includes a current log receiver 540, prior log data access unit 510, abnormality detection unit 525, watch list 515, error database 520, warning database 530, and dynamic log parameter adjuster 535. The current log receiver 540 may receive logs from other modules in the logging system and may manage the queue of logs communicated to the abnormality detection unit 525.

Abnormalities may be detected using many methods, for example, including but not limited to, using a watch list 515, frequency of errors (as stored in error database 520) or warnings, or threshold conditions for log data items (as stored in warning database 530). Those skilled in the art will recognize that the sources of abnormalities may be implemented using detection criteria alone or in combination, as appropriate for a particular system implementation. In some embodiments, abnormalities may trigger automatic updates to the dynamic flagging level 120 or dynamic log levels 140 or these may be adjusted manually by, including but not limited to, administrators or developers.

The prior log data access unit 510 may access and receive previous logs to monitor and evaluate prior logs from the log database 145 for abnormalities. The abnormality detection unit 525 may receive log data from one or more of, including but not limited to, the current log info receiver 540, prior log data access unit 510, watch list 515, error database 520, or warning database 530 and output detected abnormalities to the dynamic log parameter adjuster 535. The abnormality detection unit 525 may calculate whether a current log 505 received from the current log info receiver 540 contains abnormalities according to, for example, event thresholds, calculations, data or event categories, or other criteria that may be used to detect abnormalities in log data. In some embodiments, the watch list 515, error database 520, and warning database 530 may contain criteria for detecting abnormalities and may communicate these criteria to the abnormality detection unit 525. In this way, the log data analysis module may monitor logs from user application activities in real time and provide feedback as to whether dynamic flagging level or dynamic log levels need to be adjusted.

The dynamic log parameter adjuster 535 may communicate with one or more of the dynamic flagging level 120 or dynamic log levels 140 to provide adjusted parameters for flagging data for dynamic logging or levels of log recording. For example, in some embodiments the abnormality detection unit 525 may detect a marked increase in errors regarding a particular user, USER1. The abnormality detection unit may determine that dynamic log levels 140 parameter for USER1 should be adjusted to DEBUG level, and communicate this abnormality to the dynamic log parameter adjuster 535. The dynamic log parameter adjuster 535 may receive the output from the abnormality detection unit 525 and may communicate with the dynamic log levels 140 that the logging level for USER1 should be set to DEBUG.

Figure 6:
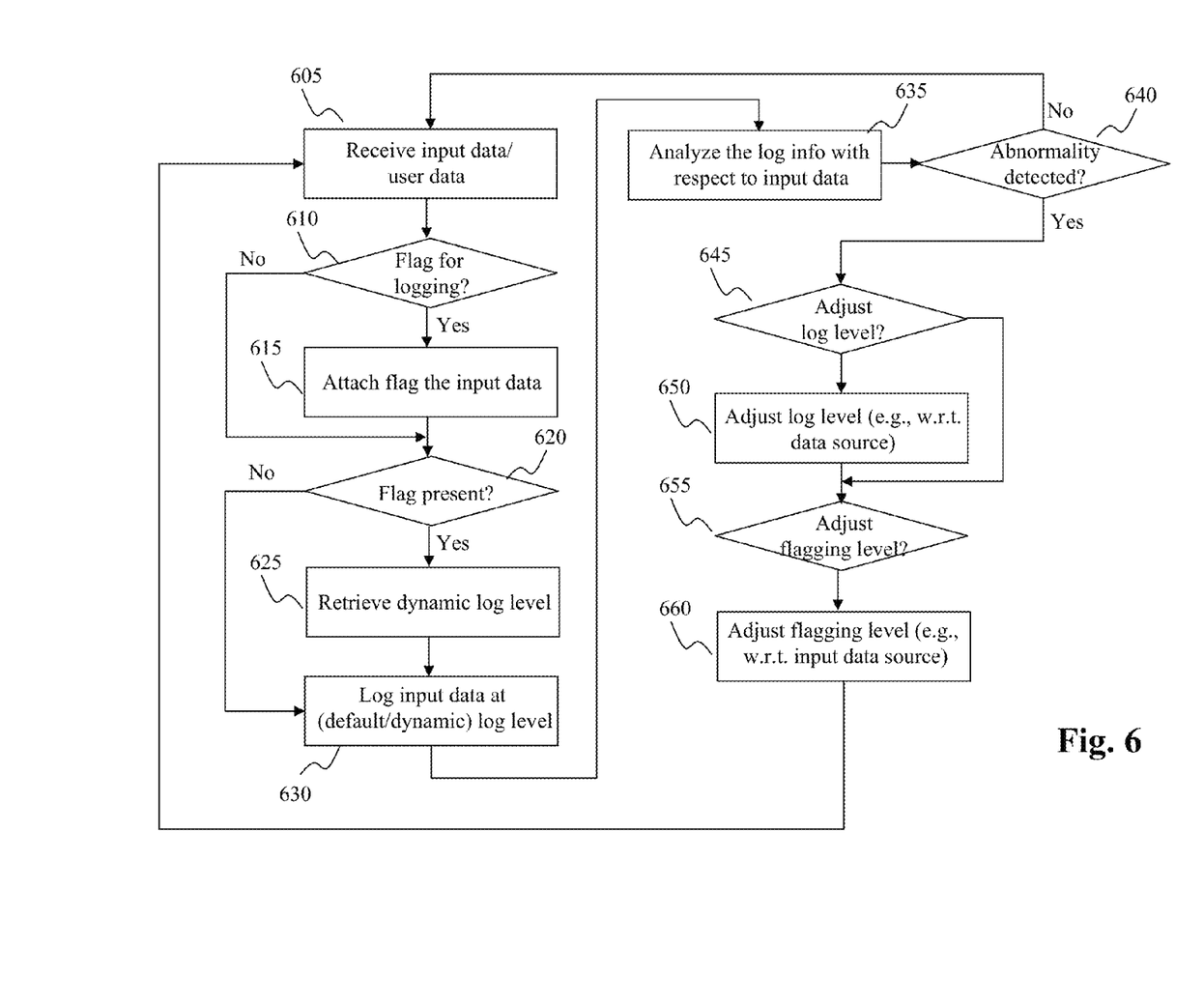
FIG. 6 is a flowchart of an exemplary a dynamic data logging process according to an embodiment of the present teaching.

FIG. 6 is a flowchart of an exemplary process in which the data driven dynamic logging system 100 operates for data driven dynamic logging, according to an embodiment of the present teaching. The modules and structures described in the method here are not limiting and any suitable module or code may be used to effectuate the steps described herein.

First, input data or user data may be received 605 by the decision module 110 and processed to determine if that input data or user data should be flagged for logging 610. A decision to flag may be based on whether the input data meets a specific criteria, e.g., f(x)=1, means that data should be flagged, whereas f(x)=0 means that no flagging is necessary (where x represents input data). Based on criteria, including but not limited to dynamic flagging level 120 or trigger function 115, the decision module 110 may determine whether the input data should be flagged 610. If the system determines that the input data should be flagged 610, a flag may be attached to the input data 615. If the system determines that the input data should not be flagged 610, the data may be transmitted to the logging module wrapper 125. The logging module wrapper 125 may then determine whether the input data has a flag attached 620. If a flag is attached, the logging module wrapper 110 may retrieve the dynamic log level 625 from the dynamic log levels data structure 140. The log data collection unit 130 may then log the input data 630 in the log database 145 at the default or dynamic log level. The log data collection unit 130 may determine the level at which to log the input data according to whether a flag is attached to the input data.

In some embodiments, the log information may be processed by the log analysis module 135, which may analyze the log information with respect to the input data at step 635. The log analysis module 135 may then detect abnormalities in the log information at step 640. The log analysis module 135 may accept input from one or more of, including but not limited to, a logging module wrapper 125, dynamic log levels 140, a log collection unit 130, a log database 145 to detect anomalies. If the log analysis module 135 detects an anomaly in step 640, the log analysis module 135 may determine whether the logging level should be adjusted in step 645. In the case that the log analysis module 135 determines that the logging level should be adjusted, the log analysis module 135 may adjust the dynamic log levels 140 appropriately at step 650. For example, if the log analysis module 135 detected a rise in ERROR logs for a particular user, the log analysis module 135 may determine at step 645 that input data from that user should be logged using the DEBUG log level. In such a case, the log analysis module may adjust the dynamic log levels 140 to DEBUG at step 650.

In some embodiments, the log analysis module 135 may next determine whether the flagging level should be adjusted in step 655. In the case that the flagging level should be adjusted, the log analysis module 135, in step 660, may adjust the dynamic flagging level 125 to flag data according to the adjusted dynamic level. For example, the flagging level may be adjusted if there is increased latency on certain application pages. This uptrend in latency may cause the flagging rate to increase from 1% to 5%, to 20%, etc. This may result in more information being collected by raising the logging level. A person having skill in the art will realize that determining whether dynamic log levels 140 or dynamic flagging level 125 should be adjusted may be conducted in any order.

Figure 7A:
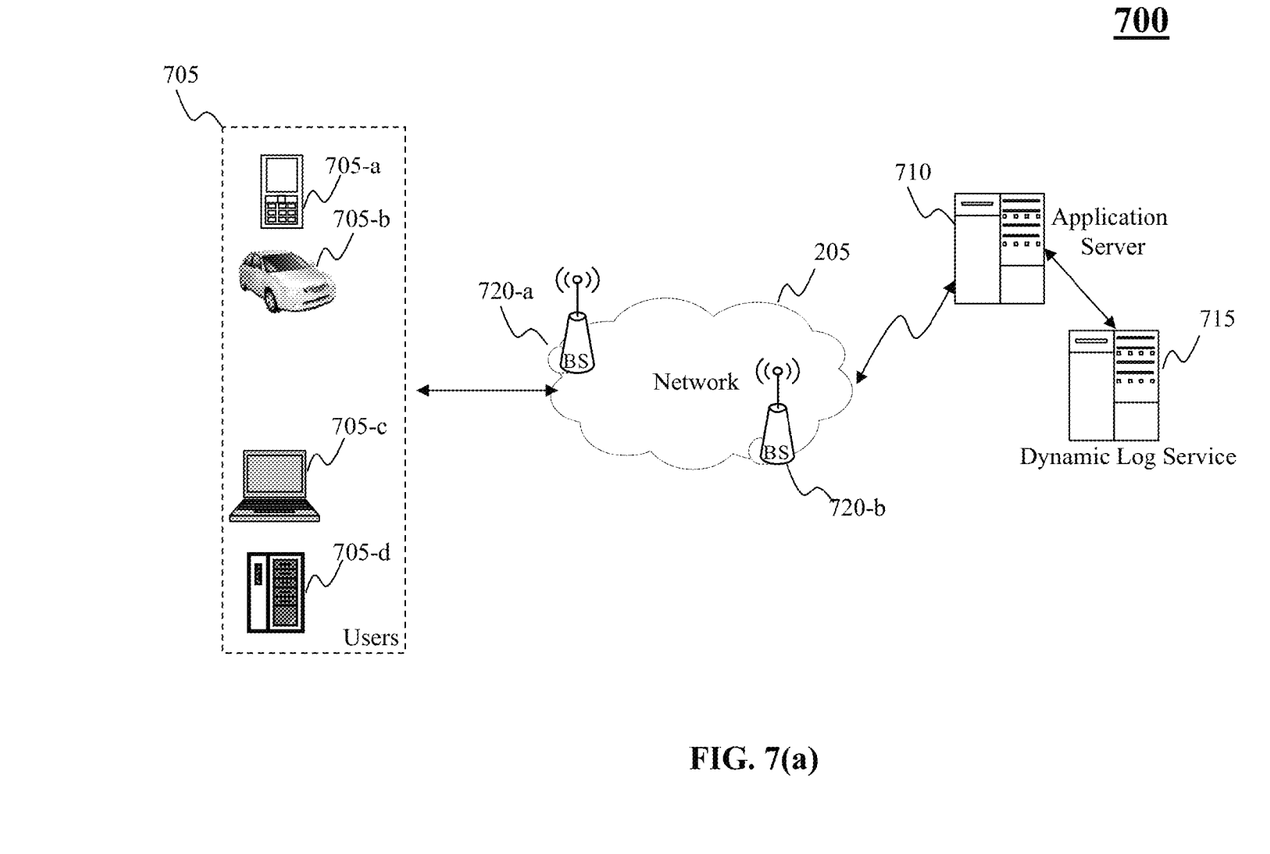
FIGS. 7(a)-7(b) are high level depictions of different system configurations in which data driven dynamic logging can be applied in system logging, according to an embodiment of the present teaching.
Figure 7B:
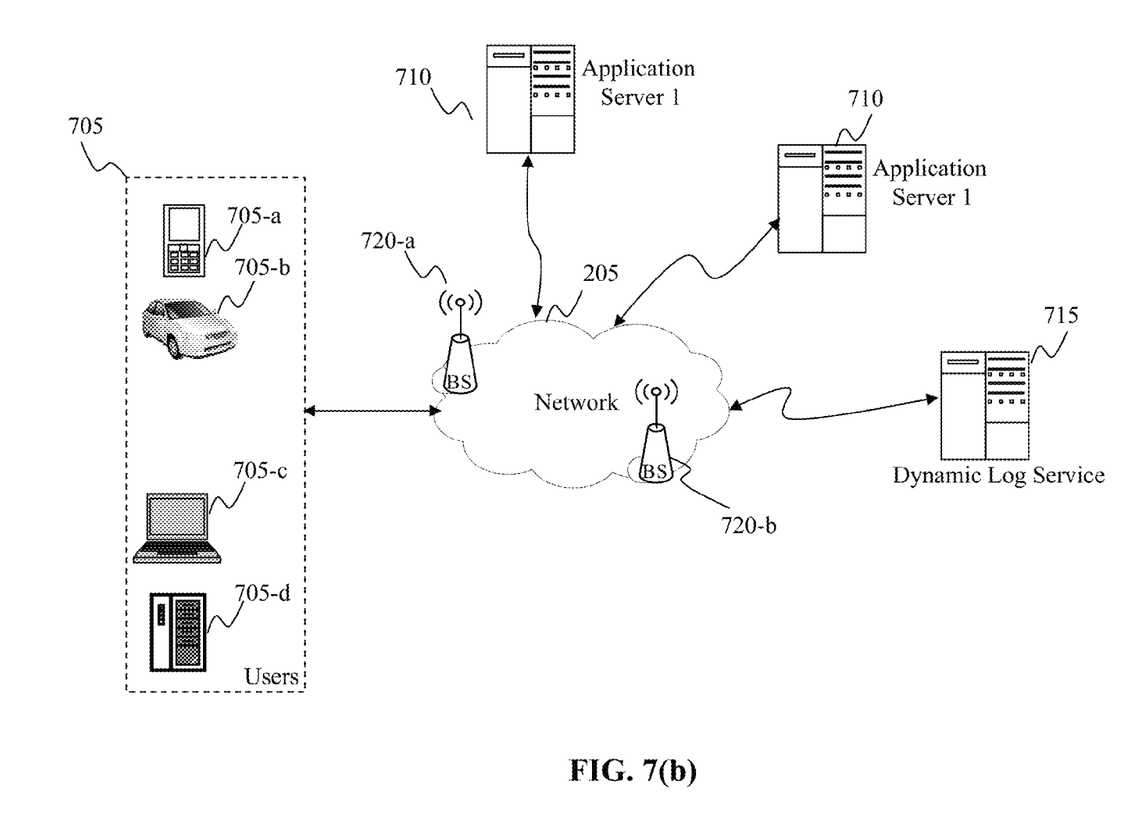

FIGS. 7(a)-7(b) are high level depictions of system configurations in which data driven dynamic logging can be applied in dynamic system logging, according to an embodiment of the present teaching. In FIG. 7(a), the exemplary system 700 includes users 705, a network 205, an application server 710, and a dynamic log service 135. The network 205 can be a single network or a combination of different networks. For example, a network can be a local area network (LAN), a wide area network (WAN), a public network, a private network, a proprietary network, a Public Telephone Switched Network (PSTN), the Internet, a wireless network, a virtual network, or any combination thereof. A network may also include various network access points, e.g., wired or wireless access points such as base stations or Internet exchange points 720-a, . . . , 720-b, through which a data source may connect to the network in order to transmit information via the network.

Users 705 may be of different types such as users connected to the network via desktop connections 705-d, users connecting to the network via wireless connections such as through a laptop 705-c, a mobile device 705-a, or a built-in device in a motor vehicle 705-b. A user may send a query to the application server 1 710 via the network 205 which may then be logged by the dynamic log service 715.

In FIG. 7(b), the exemplary system includes multiple application servers 710 connected through the network 205. In this embodiment, the dynamic log service 715 may be connected directly to the network 205 and may communicate with the application servers 710 through the network 205. Those skilled in the art will understand that the dynamic log service 715 may be configured to connect directly or indirectly through one or more networks 205 to the application servers 710.

Generally, to implement the present teaching, computer hardware platforms may be used as the hardware platform(s) for one or more of the elements described herein (e.g., the decision module 110, logging module wrapper 125, logging module 105, and/or the log database 145). The hardware elements, operating systems and programming languages of such computers are conventional in nature, and it is presumed that those skilled in the art are adequately familiar therewith to adapt those technologies to implement the ad modality/format selection and modification as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 8:
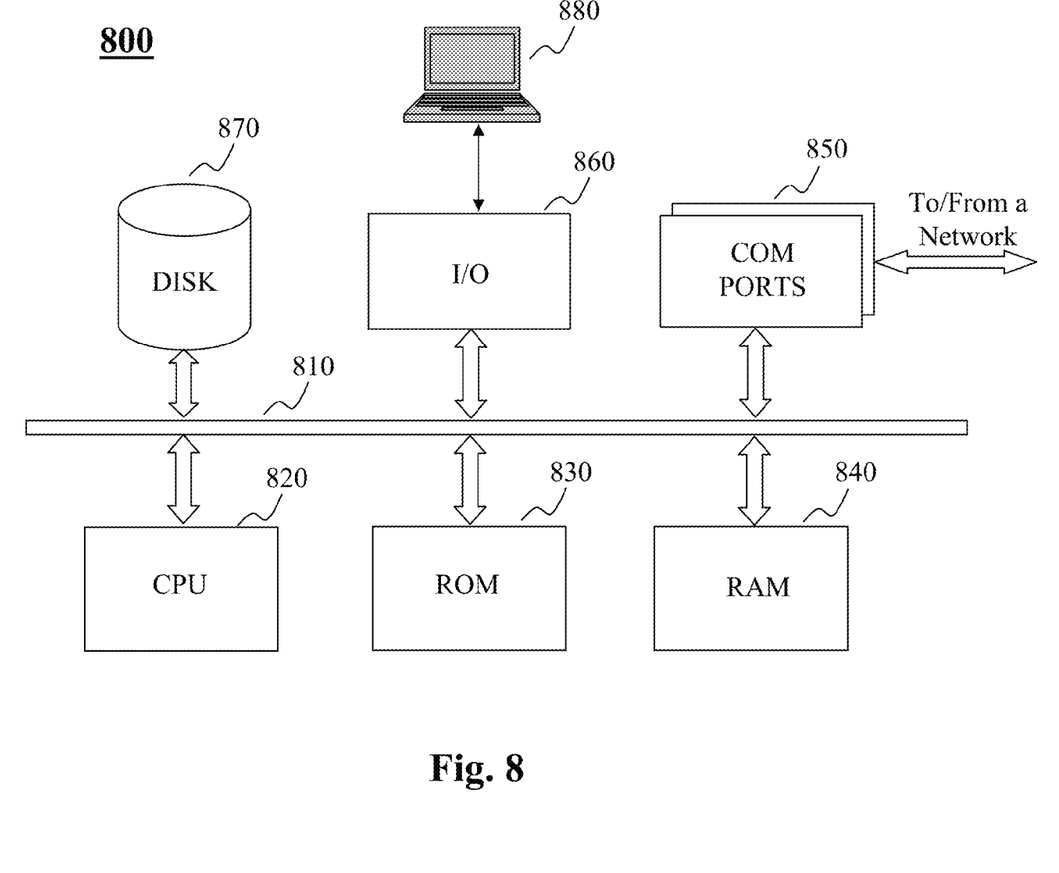
FIG. 8 depicts a general computer architecture on which the present teaching can be implemented.

FIG. 8 depicts a general computer architecture on which the present teaching can be implemented and has a functional block diagram illustration of a computer hardware platform which includes user interface elements. The computer may be a general purpose computer or a special purpose computer. This computer 800 can be used to implement any components of the data driven dynamic logging system 100 as described herein, including via hardware, software program, firmware, or a combination thereof. Although only one such computer is shown, for convenience, the computer functions relating to data driven dynamic logging may be implemented in a distributed fashion on a number of similar platforms, to distribute the processing load.

The computer 800, for example, includes COM ports 850 connected to and from a network connected thereto to facilitate data communications. The computer 800 also includes a central processing unit (CPU) 820, in the form of one or more processors, for executing program instructions. The exemplary computer platform includes an internal communication bus 810, program storage and data storage of different forms, e.g., disk 870, read only memory (ROM) 830, or random access memory (RAM) 840, for various data files to be processed and/or communicated by the computer, as well as possibly program instructions to be executed by the CPU. The computer 800 also includes an I/O component 860, supporting input/output flows between the computer and other components therein such as input data 150-a or user data 150-b. The computer 800 may also receive programming and data via network communications.

Hence, at least some aspects of the methods of the methods described herein may be embodied in programming. Program aspects of the technology may be thought of as "products" or "articles of manufacture" typically in the form of executable code and/or associated data that is carried on, embodied in, or physically stored on a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, among the decision module 110, logging module wrapper 125, logging module 105, and/or log database 145. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, data drive dynamic logging system and its components as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

I claim:

1. A method implemented on a machine having one or more processor, storage, and communication platform for creating a log, comprising:
   receiving a data traffic;
   evaluating the data traffic to determine a first indicator that indicates whether to log the data traffic according to a fixed level or a dynamic level;
   if the first indicator indicates to log the data traffic according to the fixed level, obtaining the fixed level, and
logging the data traffic in accordance with the fixed level;
if the first indicator indicates to log the data traffic according to the dynamic level,
obtaining a second indicator indicative of the dynamic level, and
logging the data traffic in accordance with the dynamic level indicated by the second indicator;
analyzing log information to determine health of the data traffic;
dynamically adjusting the dynamic level based on the health of the data traffic;
determining whether to adjust the first indicator; and
adjusting the first indicator if the first indicator is determined to be adjusted.

2. The method of claim 1, wherein the first indicator is determined based on one or more criteria which include at least one of a random sampling rate, an even trigger, a user related the data traffic, content related to the data traffic, and an application related to the data traffic.

3. The method of claim 1, wherein the first indicator is dynamically adjusted based on the health of the data traffic.

4. The method of claim 1, wherein the second indicator is adjustable across a plurality of logging levels, each of which represents an extent to which information associated with the data traffic is to be collected.

5. A system having at least one processor, a storage, and a communication platform for creating a log, the system comprising:
a decision module configured to
receive a data traffic, and
evaluate the data traffic to determine a first indicator that indicates whether to log the data traffic according to a fixed level or a dynamic level;
a logging module wrapper configured to
obtain the fixed level if the first indicator indicates to log the data traffic according to the fixed level, and
obtain a second indicator indicative of the dynamic level if the first indicator indicates to log the data traffic according to the dynamic level;
a log data collection unit configured to
log the data traffic in accordance with the fixed level if the first indicator indicates to log the data traffic according to the fixed level, and
log the data traffic in accordance with the dynamic level indicated by the second indicator if the first indicator indicates to log the data traffic according to the dynamic level; and
a log analysis module configured to
analyze log information to determine health of the data traffic,
dynamically adjust the dynamic level based on the health of the data traffic,
determine whether to adjust the first indicator, and
adjust the first indicator if the first indicator is determined to be adjusted.

6. The system of claim 5, wherein the first indicator is determined based on one or more criteria which include at least one of a random sampling rate, an even trigger, a user related the data traffic, content related to the data traffic, and an application related to the data traffic.

7. The system of claim 5, wherein second indicator is adjustable across a plurality of logging levels, each of which represents an extent to which information associated with the data traffic is to be collected.

8. A non-transitory machine-readable medium having information recorded thereon for creating a log, wherein the information, when read by the machine, causes the machine to perform the following:
receiving a data traffic;
evaluating the data traffic to determine a first indicator that indicates whether to log the data traffic according to a fixed level or a dynamic level;
if the first indicator indicates to log the data traffic according to the fixed level,
obtaining the fixed level, and
logging the data traffic in accordance with the fixed level;
if the first indicator indicates to log the data traffic according to the dynamic level,
obtaining a second indicator indicative of the dynamic level, and
logging the data traffic in accordance with the dynamic level indicated by the second indicator;
analyzing log information to determine health of the data traffic;
dynamically adjusting the dynamic level based on the health of the data traffic;
determining whether to adjust the first indicator; and
adjusting the first indicator if the first indicator is determined to be adjusted.

9. The medium of claim 8, wherein the first indicator is determined based on one or more criteria which include at least one of a random sampling rate, an even trigger, a user related the data traffic, content related to the data traffic, and an application related to the data traffic.

10. The medium of claim 8, wherein the first indicator is dynamically adjusted based on the health of the data traffic.

11. The medium of claim 8, wherein the second indicator is adjustable across a plurality of logging levels, each of which represents an extent to which information associated with the data traffic is to be collected.

* * * * *